US012160093B2

United States Patent
Ehmann et al.

(10) Patent No.: US 12,160,093 B2
(45) Date of Patent: Dec. 3, 2024

(54) DEVICE FOR THE FEED-THROUGH AND STRAIN RELIEF OF STRANDS

(71) Applicant: ICOTEK PROJECT GMBH & CO. KG, Eschach (DE)

(72) Inventors: Valentin Ehmann, Schwabisch Gmund (DE); Bruno Ehmann, Mogglingen (DE)

(73) Assignee: ICOTEK PROJECT GMBH & CO. KG, Eschach (DE)

( * ) Notice: Subject to any disclaimer, the term of this patent is extended or adjusted under 35 U.S.C. 154(b) by 0 days.

(21) Appl. No.: 17/219,354

(22) Filed: Mar. 31, 2021

(65) Prior Publication Data

US 2021/0328416 A1 Oct. 21, 2021

(30) Foreign Application Priority Data

Apr. 8, 2020 (DE) .......................... 102020204526.7

(51) Int. Cl.
*H02G 3/22* (2006.01)
*H02G 15/007* (2006.01)

(52) U.S. Cl.
CPC ............ *H02G 3/22* (2013.01); *H02G 15/007* (2013.01)

(58) Field of Classification Search
CPC . H02G 3/22; H02G 15/007; F16L 5/14; F16L 5/10
See application file for complete search history.

(56) References Cited

U.S. PATENT DOCUMENTS

| | | | |
|---|---|---|---|
| 3,053,564 A * | 9/1962 | Evans | B60J 5/04 439/31 |
| 3,633,250 A * | 1/1972 | Romney | F16B 7/0446 403/233 |
| 4,857,672 A * | 8/1989 | Rebers | G02B 6/4444 174/92 |
| 4,889,298 A * | 12/1989 | Hauff | F16L 5/08 174/503 |

(Continued)

FOREIGN PATENT DOCUMENTS

| | | | |
|---|---|---|---|
| CA | 2475261 A1 | 1/2006 | |
| CH | 682784 A5 * | 11/1993 | ............... H02G 3/22 |

(Continued)

*Primary Examiner* — Timothy J Thompson
*Assistant Examiner* — Rhadames Alonzo Miller
(74) *Attorney, Agent, or Firm* — Faegre Drinker Biddle & Reath LLP

(57) ABSTRACT

The invention relates to a device for the feed-through and strain relief of strands through a wall opening having a frame arranged around and/or at least partially in the wall opening, having at least one strain relief grommet which encloses the strand and is accommodated at least positively in the frame, wherein the frame comprises at least two detachably connected frame parts, between which the strain relief grommet is directly or indirectly pressed in the connected state of the frame parts.

The invention is characterized in that the strain relief grommet has at least two sections which, in the compressed state with the strand inserted, are spaced apart from one another or, at most, are connected via at least one elastic region, so that the force flow between the at least one first section and the at least one other section extends via the strand.

11 Claims, 4 Drawing Sheets

(56) References Cited

U.S. PATENT DOCUMENTS

| | | | | |
|---|---|---|---|---|
| 5,981,877 A * | 11/1999 | Sakata | | B60R 16/0222 |
| | | | | 439/567 |
| 6,152,767 A * | 11/2000 | Roosen | | H02G 15/013 |
| | | | | 439/587 |
| 6,278,060 B1 * | 8/2001 | Mori | | H02G 3/0475 |
| | | | | 174/152 G |
| 6,497,414 B1 * | 12/2002 | Roosen | | H02G 15/013 |
| | | | | 277/316 |
| 6,660,937 B1 * | 12/2003 | MacLeod | | H02G 3/22 |
| | | | | 174/152 G |
| 2001/0008330 A1 * | 7/2001 | Sakata | | B60R 16/0222 |
| | | | | 277/316 |
| 2002/0038492 A1 * | 4/2002 | Hashimoto | | F16L 5/10 |
| | | | | 16/2.1 |
| 2002/0129958 A1 * | 9/2002 | Petri | | H02G 3/088 |
| | | | | 174/546 |
| 2003/0010566 A1 * | 1/2003 | Miyakawa | | F02M 35/10301 |
| | | | | 181/204 |
| 2003/0014924 A1 * | 1/2003 | Nakamura | | B60R 13/0846 |
| | | | | 52/1 |
| 2003/0015339 A1 * | 1/2003 | Sato | | B60R 16/0222 |
| | | | | 174/668 |
| 2004/0140118 A1 * | 7/2004 | Nishimoto | | H02G 3/22 |
| | | | | 174/650 |
| 2004/0154819 A1 * | 8/2004 | Sakata | | B60R 16/0222 |
| | | | | 174/650 |
| 2005/0140075 A1 * | 6/2005 | Mishima | | F02B 77/13 |
| | | | | 267/140.11 |
| 2006/0185875 A1 * | 8/2006 | Habel | | H02G 3/22 |
| | | | | 174/50 |
| 2007/0246613 A1 * | 10/2007 | Kennedy | | H02G 3/32 |
| | | | | 248/56 |
| 2008/0017401 A1 * | 1/2008 | Uchida | | H02G 3/22 |
| | | | | 174/153 G |
| 2008/0220659 A1 * | 9/2008 | Ikeya | | H01R 13/5213 |
| | | | | 439/701 |
| 2009/0000861 A1 * | 1/2009 | Hikami | | F01N 13/102 |
| | | | | 181/200 |
| 2009/0028659 A1 * | 1/2009 | Shibuya | | F16B 21/073 |
| | | | | 411/57.1 |
| 2009/0056230 A1 * | 3/2009 | Flendrig | | B60R 16/0215 |
| | | | | 49/502 |
| 2009/0065235 A1 * | 3/2009 | Uchibori | | B60R 16/0222 |
| | | | | 174/152 G |
| 2010/0176533 A1 * | 7/2010 | Hayashi | | B29C 45/14418 |
| | | | | 264/252 |
| 2010/0314158 A1 * | 12/2010 | Suzuki | | H02G 3/22 |
| | | | | 174/152 G |
| 2011/0073350 A1 * | 3/2011 | Okuhara | | B60R 16/0222 |
| | | | | 174/152 G |
| 2011/0247172 A1 * | 10/2011 | Yoshii | | F16B 21/073 |
| | | | | 16/2.1 |
| 2012/0193140 A1 * | 8/2012 | Briere | | H02G 3/22 |
| | | | | 174/650 |
| 2012/0211262 A1 * | 8/2012 | Agusa | | B60R 16/0222 |
| | | | | 174/152 G |
| 2012/0217041 A1 * | 8/2012 | Agusa | | B60R 16/0222 |
| | | | | 174/153 G |
| 2012/0252272 A1 * | 10/2012 | Omae | | H01R 13/506 |
| | | | | 439/607.01 |
| 2013/0008693 A1 * | 1/2013 | Okuhara | | F16L 5/10 |
| | | | | 174/152 G |
| 2013/0199823 A1 * | 8/2013 | Kanai (Popovici) | | H02G 3/0468 |
| | | | | 174/152 G |
| 2014/0060947 A1 * | 3/2014 | Braun | | B23P 11/00 |
| | | | | 16/2.2 |
| 2014/0231133 A1 * | 8/2014 | Fritz | | G21C 13/06 |
| | | | | 174/650 |
| 2015/0041210 A1 * | 2/2015 | Inao | | B60R 16/0215 |
| | | | | 174/72 A |
| 2015/0285408 A1 * | 10/2015 | Cox | | F16L 5/14 |
| | | | | 277/628 |
| 2016/0134090 A1 * | 5/2016 | Kushima | | H05K 9/0098 |
| | | | | 174/362 |
| 2017/0179703 A1 * | 6/2017 | Kominato | | H01B 7/0045 |
| 2017/0219100 A1 * | 8/2017 | Kobayashi | | F16J 15/52 |
| 2017/0234434 A1 * | 8/2017 | Shuto | | F16J 15/3232 |
| | | | | 277/504 |
| 2017/0349123 A1 * | 12/2017 | Katoh | | H01B 17/583 |
| 2018/0128400 A1 * | 5/2018 | Twelves | | H02G 15/013 |
| 2018/0145430 A1 * | 5/2018 | Yanai | | H01R 4/70 |
| 2018/0342830 A1 * | 11/2018 | Mizuno | | H02G 15/013 |
| 2019/0089142 A1 * | 3/2019 | Sugino | | H02G 3/34 |

FOREIGN PATENT DOCUMENTS

| | | |
|---|---|---|
| DE | 8705804 U1 | 6/1988 |
| DE | 4441478 A1 | 5/1996 |
| DE | 10313989 A1 | 10/2004 |
| WO | 95/31025 A1 | 11/1995 |

* cited by examiner

DEVICE FOR THE FEED-THROUGH AND STRAIN RELIEF OF STRANDS

CROSS-REFERENCE TO RELATED APPLICATIONS

The present application claims priority to DE 102020204526.7, filed Apr. 8, 2020, the disclosure of which is hereby expressly incorporated herein by reference.

BACKGROUND/SUMMARY

The disclosure relates to a device for the feed-through and strain relief of strands, in particular of cables or conduits, through a wall opening according to the type defined in closer detail in the preamble of claim 1.

WO 01/42046 A2, for example, describes a generic device under the title of cable bushing. The structure there is a frame, which is designed in two parts. In this frame, so-called grommets can be inserted in a positive manner at provided slots, which in turn consist of an elastic material and are designed via a slot in such a way that they can be folded out laterally. This allows a strand, e.g. a cable, to be inserted into an opening arranged centrally in the grommet, for example, and the grommet to be folded back around this and inserted into the frame. This has the decisive advantage that even prefabricated cables with already mounted connectors, which could not be threaded through the opening of the grommet, can be used without any problems. It is the grommet's task here to seal the wall opening or its slot in the frame accordingly and also to hold the cable securely with the parts surrounding its central opening and to reliably seal the area between the cable and the grommet. For this purpose, the grommet is formed from a relatively soft elastic material which, for example, has a hardness of less than 75 Shore-A(15s). These grommets are also capable of providing strain relief for the cables. However, if the tensile forces become greater, the elasticity of the grommet means that the cable cannot be held securely and reliably under all circumstances. This is a disadvantage of such structures.

Instead of the two-part screwable frame of the WO publication mentioned, the frame can also be closed, for example, via a clip connection. For the various designs of the frame, reference can be made to DE 10 2018 205 702 A1 purely by way of example. Other forms of the frame are also conceivable. Another type of a frame can also be a so-called cable gland, in which the frame is partially arranged in the wall opening. An example of this may be WO 2018/210892 A1.

As mentioned above, all these structures provide a high degree of tightness and relatively good strain relief, but they cannot withstand very strong forces acting on the strands, e.g. cables, in all situations. A solution to this problem is known in principle from DE 44 41 478 A1. A kind of extension is attached to the actual grommet, which then has or can accommodate elements that provide strain relief for the cable in addition to the grommet. For example, the cable can be fixed to the extension by means of a cable tie. The structure has the serious disadvantage that it offers little flexibility and that it has extensions projecting beyond the actual structure, which is a serious disadvantage in the usual application, namely the insertion of strands through wall openings in switch cabinets, machine controls or the like, since here a surface with as few angles as possible is of decisive advantage with regard to contamination and the risk of possible damage.

It is now the object of the present disclosure to provide an improved device for the feed-through and strain relief of cables, which can preferably be used with existing frames.

According to the disclosure, this object is solved by a device having the features in claim 1, and here in particular in the characterizing part of claim 1.

It has become apparent to the inventors that a new type of grommet, which is designed to be positively received in the frame, can ideally solve this object. As before, the frame is constructed from at least two detachably connected frame parts between which the grommet is pressed directly or indirectly in the connected state of the frame parts, e.g. via a further grommet in the same receiving chamber of the frame for the grommets. The grommet is also positively received in the frame, preferably—but not necessarily—transversely to the axial direction or running direction of the inserted strand, in order to dissipate tensile forces transmitted to the grommet and acting on the strand to the frame and via the latter into the wall.

According to the disclosure, the strain relief grommet has at least two sections which, in the compressed state with the strand inserted, are spaced apart from one another or at most connected via at least one elastic region. Thus, the force flow between the at least one first section and the at least one other section always extends completely or at least largely via the strand. This provides very good strain relief, even in the case of high forces that may pull on the strand.

Since the sections are spaced apart from one another in the compressed state, it is ensured that they are pressed onto the strand, for example the sheath of a cable, and do not block one another with regard to their path during compression. Alternatively, particularly in the case of an integral hinged design of the strain relief grommet, a structure can be provided in which the sections of the strain relief grommet are connected via elastic regions. In this case, such elastic regions absorb virtually no forces, so that the principle of transmitting the forces entirely or at least largely via the strand is also preserved here. A C-shaped design of the grommet would also preserve this principle, since here too increasing compression of the upper and lower sections of the C is possible with increasing force.

An advantageous design of the device according to the disclosure may provide that the gap between the at least two sections extends in a plane parallel or at an angle to the axial direction of the inserted strand. The sections are thus divided, for example, centrally analogously to the division of the frame. The gap is then continuous in the axial direction of the inserted strand. If this is to be prevented in order to prevent see-through and the direct ingress of dirt, the division can also be provided in an inclined plane. The gap can then extend, for example, with respect to the control cabinet as a preferred application, from the outside at the bottom to the inside at the top. The plane with the gap is therefore positioned obliquely, but not perpendicularly to one of the planes in which the axial direction lies.

According to a very favorable further development of the disclosure, the elastic areas can, for example, be film hinges, so that the elasticity is achieved here via the thin wall thicknesses of the material. In this case, the elastic region is preferably divided into several individual film hinges, in order to allow the sections of the strain relief grommet to be unfolded on the one hand, which makes it possible to insert prefabricated cables, and on the other hand, to design the strain relief grommet from several parts. However, if, for example, two sections are connected to each other via film hinges, this has the decisive advantage that the parts remain together and cannot be partially mislaid during assembly.

The film hinge itself, which can preferably be formed into several film hinges along the axial direction of the strand, for example the running direction of the cable or conduit, is so elastic that on the one hand it is possible to fold the sections open against each other, for example to accommodate the cable, in particular the prefabricated cable. On the other hand, it allows the components to be pressed against each other almost exclusively via the strand, since the film hinge does not offer any appreciable resistance to such pressing. On the side opposite the film hinge, a corresponding distance can then also remain in the pressed state so as to prevent, as already mentioned above, the sections of the strain relief grommet lying against each other during pressing, so that the entire force which acts on the strain relief grommet during pressing of the parts of the frame is passed on to the strand or its sheathing in order to ensure ideal strain relief.

As an alternative or in particular also as a supplement as well as optionally also for the protection of the film hinges, it can be provided according to a very advantageous design of the disclosure that the at least two sections are surrounded by a softer and/or more elastic material than the one they are made of and are connected by this material in a hinged manner. Thus, a softer and/or more elastic material, in particular that of a conventional sealing grommet, can completely or preferably partially surround the harder material of the sections. This makes it possible, on the one hand, to connect the sections via the elastic region and, on the other hand, to achieve an additional sealing effect while continuing to provide very good strain relief through the sections. Since the entire strain relief is achieved via the harder sections, it would also be conceivable to use a much softer material than has been customary in sealing grommets to date.

It may be provided that the at least two sections are inserted into corresponding openings of the softer and/or more elastic material or are also completely or preferably partially extrusion-coated by the latter. The softer and/or more elastic material thus forms the connection and can support or even replace the film hinge. It can also provide the connection to the frame, so that the two sections are inserted as harder and/or stiffer parts quasi openings in a conventional sealing grommet and/or are partially encased by it.

According to a very favorable design thereof, the softer and/or more elastic material in the compressed state can interact in a sealing manner with the frame, with itself along a slot for folding out and/or further strain relief grommets in the frame. The result is a kind of combination grommet that combines the sealing properties of the sealing grommet with those of a pure strain relief grommet by accommodating the harder and/or stiffer sections that transmit the forces occurring during compression directly to each other via the strand, while the softer and/or more elastic material is compressed to seal with itself, the slot, the circumference of the strand and the frame.

A very simple and cost-effective alternative to such a combination grommet, which is complex to manufacture, is a pure strain relief grommet formed by the at least two sections without these being sheathed by or inserted into any other material. Ideally, the sections are connected by at least one film hinge, but they do not have to be.

Compared to the material of the conventional sealing grommet, the sections are preferably harder and/or stiffer. According to a very favorable further development of the disclosure, they can have a hardness of more than 75 Shore-A(15s). Due to the higher hardness of the sections, higher clamping forces on the strand are achieved during insertion and pressing of such a strain relief grommet, for example during screwing or clipping of the frame parts to one another. Suitable materials for such a strain relief grommet can be, for example, TPE, hard EPDM or NBR or also soft PP or soft PA. Other materials are also possible, of course, but the above-mentioned materials are common in the field of cable bushings and can be easily used in production without the need for new know-how or the like in their processing.

The shore hardness is especially detected with a shore hardness detecting device. The measurement takes place according to ISO 868 in the version effective at the priority date. For the hardness according to shore A the sample to be measured is pressed to a measuring table with a force of 12.5 Newton. The sample has to be at least 6 millimeters thick and has a temperature of 21 to 25° C. The measurement is carried out with a needle with blunt point. The point area of this cone has a diameter of 0,79 millimeters, the opening angle of the cone is 35°. The mass used to press the cone into the sample is 1 kg, the dwell time is 15 seconds. The results are therefore typically marked as Shore A(15s) or A/15s.

A further very favorable design of the device according to the disclosure further provides that projections are provided in the region of contact between the strand and the sections. These projections can be formed in the axial direction of the strand in order to reliably position it. According to a very advantageous further development of the idea, they can also be formed transversely to the axial direction of the strand in order to dig into the sheathing of the strand to a certain extent and thus further improve the strain relief, since the strand is more strongly compressed with the sections when the frame is closed and thus higher strain relief forces can be transferred to the frame via the sections. According to another very favorable design of this idea, the projections extending transversely to the axial direction of the strand may be perforated several times over the circumference, so as to further increase the friction by a kind of interlocking between the strand or its sheathing and the sections.

An exceptionally favorable further development of the device according to the disclosure now further provides that in the axial direction of the inserted strand, upstream or downstream of the strain relief grommet formed here preferably exclusively from the sections, a sealing grommet is provided for positive accommodation in the frame and for contact with the strand, which grommet has a hardness of less than 75 Shore-A(15s). In addition to the—here preferably pure—strain relief grommet, preferably with one or more of the properties described above, a softer sealing grommet can thus be provided, in particular a sealing grommet as known from the prior art mentioned at the beginning. Such a sealing grommet, which according to an advantageous design of the device is formed integrally and can be folded open along the axis in the direction of the strand, then allows, in addition to the strain relief grommet, which allows only a low sealing effect, for example against dust or coarse dirt, a correspondingly good sealing, for example in the manner described in the prior art mentioned at the beginning, so that tightness levels up to IP 67 can be realized without any problems. The frame then typically has two chambers arranged one behind the other in the axial direction of the inserted strand, which are designed on the one hand to accommodate the strain relief grommets for very reliable strain relief even at high forces on the strands, and which are designed on the other hand to accommodate the sealing grommets.

Regardless of whether two grommets are arranged one behind the other and/or several grommets are arranged next to each other, it is obviously possible to combine conventional sealing grommets with a moderate strain relief effect also in a frame with the strain relief grommets with a high strain relief effect according to the disclosure, if, for example, strands or cables with different strain relief requirements are to be passed next to each other over the frame through the wall opening.

BRIEF DESCRIPTION OF THE DRAWINGS

Further advantageous designs of the device according to the disclosure also result from the exemplary embodiments, which are shown in more detail below with reference to the figures.

The drawings show as follows.

DETAILED DESCRIPTION

Figure 1:
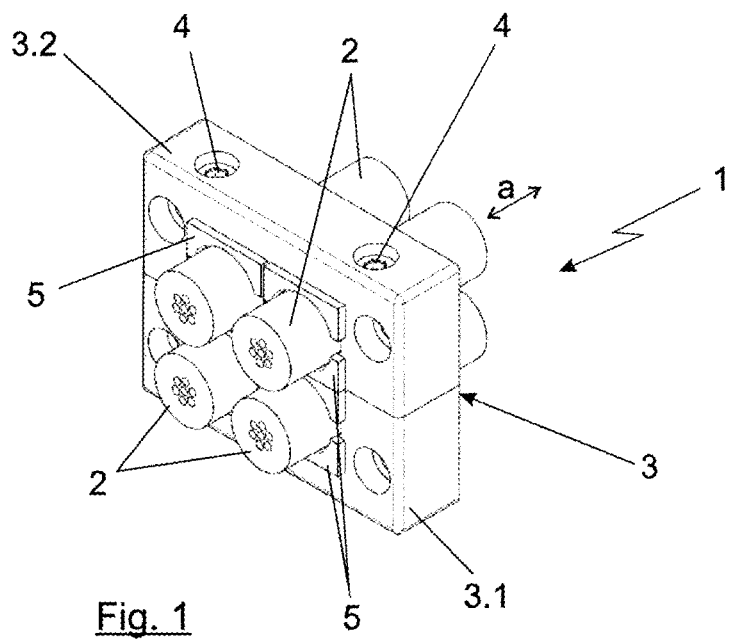
FIG. 1 shows a three-dimensional view of an embodiment of the device according to the disclosure with a first frame shape and inserted strands.

The illustration in FIG. 1 shows a device 1 for the feed-through and strain relief of strands 2, here for example of four cables. This comprises a frame 3 with a lower frame part 3.1 and an upper frame part 3.2, which are connected to each other here purely by way of example via screws 4. A connection e.g. by clipping, by a clamping lever or the like would also be conceivable. The frame 3, which is designed, for example, in the manner described in WO 01/42046 A2 mentioned at the beginning and hereby incorporated by reference, now has several slots or receiving chambers for grommets. The grommets, which then in turn receive the cables as exemplary strands 2, are all designed in the exemplary embodiment of FIG. 1 as pure strain relief grommets 5, the structure of which will be discussed in detail later.

Figure 2:
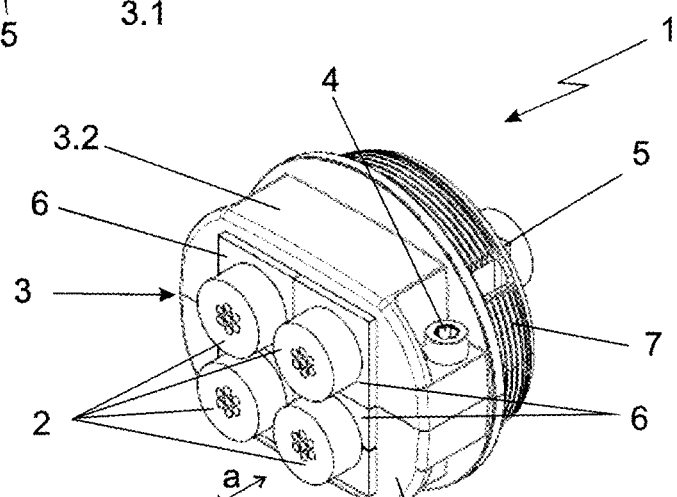
FIG. 2 shows an embodiment of the device according to the disclosure with a second frame shape and inserted strands.
Figure 3:
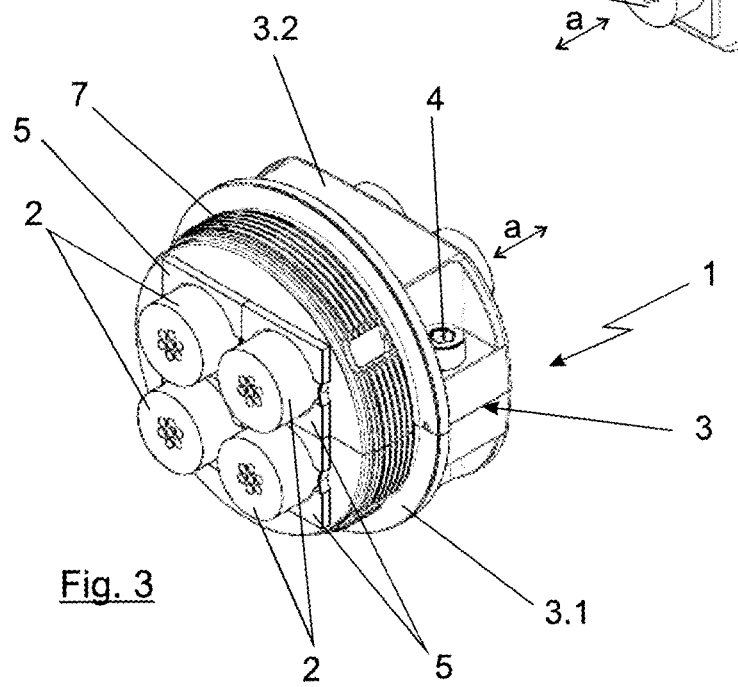
FIG. 3 shows a view of the device according to FIG. 2 from the opposite side.

The structure in FIG. 2 shows an alternative form of frame 3, also with a lower frame part 3.1 and an upper frame part 3.2, which are also connected to each other here purely by way of example via screws 4. In principle, the structure can be based, for example, on the frame in WO 2018/210892 A1 and hereby incorporated by reference mentioned at the beginning. In the exemplary embodiment of FIG. 2, the individual cables as strands 2 are accommodated in sealing grommets 6, as known from the prior art just mentioned. In the illustration of FIG. 3, which shows the structure according to FIG. 2 from the rear side, it is then possible to see the strain relief grommets 5 arranged adjacent to the sealing grommets 6 in the axial direction a of the inserted strands 2, analogous to the illustration of the frame 3 according to FIG. 1.

Both frames 3 are only intended to be mounted or used completely or partially in wall openings, for example in a control cabinet of a machine control system or the like, in order to thus guide strands 2, in particular prefabricated cables, through this wall opening. For this purpose, the frame 3 according to FIG. 1 is appropriately screwed to the part of the wall surrounding the opening, for example by providing holes there which allow screwing to the frame 3, typically after interposing a seal. The frame according to FIGS. 2 and 3 is passed through a round wall opening and then fastened by means of a nut, which is screwed onto a threaded section 7 of the frame 3 visible in the figures.

The decisive aspect of the first embodiment of the devices 1 is now the use of the strain relief grommets 5. In contrast to the sealing grommets 6, which can also be used and which are extensively known from the prior art mentioned at the beginning, the strain relief grommets 5 are made of a significantly harder material. The material preferably has a Shore hardness of more than 80 Shore A(15s) and can be, for example, TPE, a hard EPDM or NBR or also a soft PP or PA. These plastics are then ideally suited to absorbing high strain relief forces in the strain relief grommets 5 and dissipating them into the frame 3 due to their greater hardness and their special design described below. However, the sealing effect is less effective than that of the sealing grommets 6 used previously, which is why these sealing grommets 6 can be combined with the strain relief grommets 5, as can already be seen from the illustrations in FIGS. 2 and 3, and as will be explained in more detail later.

Figure 4:
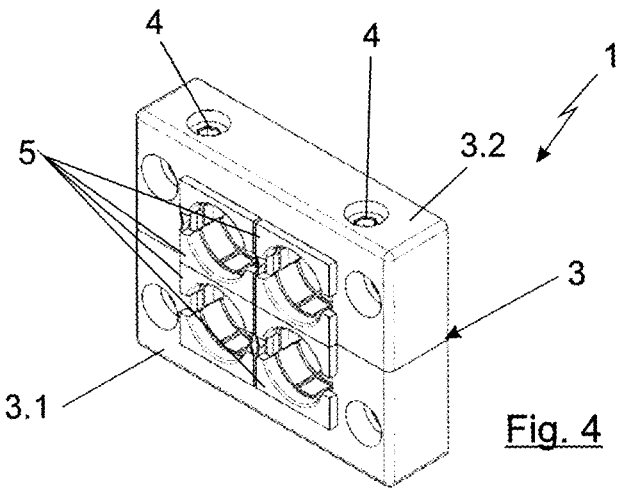
FIG. 4 shows a representation of the setup shown in FIG. 1 without the inserted strands.
Figure 5:
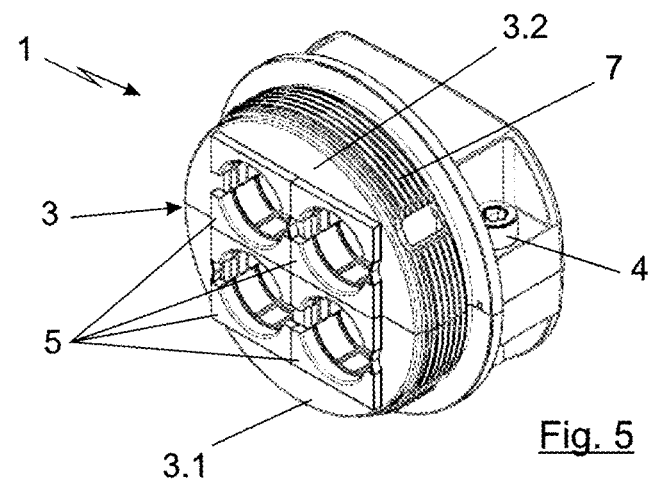
FIG. 5 shows a representation of the device according to FIG. 3 without the inserted strands.

FIGS. 4 and 5 now show views analogous to the views in FIGS. 1 and 3, but here without the strands 2. This makes it easier to recognize the strain relief grommets 5. These are discussed in more detail in the following FIGS. 6 and 7, which show two different views of the strain relief grommet 5 in one possible embodiment.

Figures 6, 7:
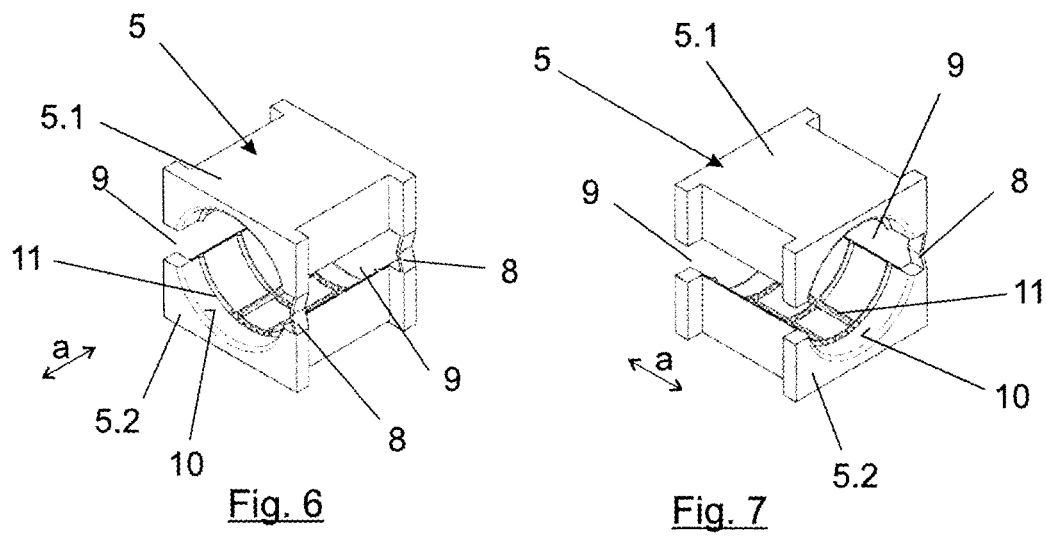
FIG. 6 shows a three-dimensional view of a possible embodiment of a strain relief grommet according to the disclosure from a first viewing direction.
FIG. 7 shows the strain relief grommet according to FIG. 6 from another viewing direction.

The strain relief grommets 5 are preferably made in one piece. An upper section 5.1 in the illustrations of FIGS. 6 and 7 is arranged in this case at a distance from a lower section 5.2 when the grommets 5 are inserted into the frame 3, as can be seen in FIGS. 4 and 5. This can alternatively be realized by two or more separate parts of the strain relief grommet 5. Preferably, as is shown here, via the two sections 5.1 and 5.2, which can be folded against each other via two film hinges 8. They can then be closed around a strand 2, in particular also around a prefabricated cable, in a manner comparable to the universally known sealing grommets 6, and inserted positively into the frame 3. As can be seen from the illustrations in FIGS. 4 and 5, the two parts or sections 5.1, 5.2 continue to be spaced apart from one another so that when the frame parts 3.1 and 3.2 are pressed together via the screws 4 or other means of closing the frame 3, they do not abut one another and the entire force acts on the strand 2 and clamps it correspondingly well, thus ensuring good strain relief even with high tensile forces.

For this purpose, the strain relief grommets 5 have laterally relatively wide gaps 9 between their sections 5.1 and 5.2, which extend along the axial direction a of the subsequently inserted strands 2. On one side the gap 9 is completely open, on the other side it is interrupted only by the two film hinges 8, although a continuous film hinge or several film hinges would also be conceivable here. The film hinges 8 are so elastic in themselves that, on the one hand, the sections 5.1 and 5.2 can be folded open against each other and, on the other hand, pressing of the sections 5.1 and 5.2 perpendicular to the running direction of the gap 9 is also possible without the film hinge 8 interfering with this. With the compression, the width of the gap 9 is reduced and the strand 2 is reliably compressed in the strain relief grommet 5 without the sections 5.1 and 5.2 abutting against each other.

To further improve the strain relief, projections 11 can be provided in a contact surface 10 of the sections 5.1, 5.2 with the strand 2. These can extend both in the axial direction a of the strand 2 and transversely thereto, i.e. in the circumferential direction of the strand 2. In particular, these projections 11 extending in the circumferential direction ensure a further improvement in strain relief. They can be interrupted several times in the circumferential direction in order to form a kind of nubs or spikes and to further improve the strain relief by a kind of clawing between the projections 11 and the sheath of the strand 2.

Figure 8:
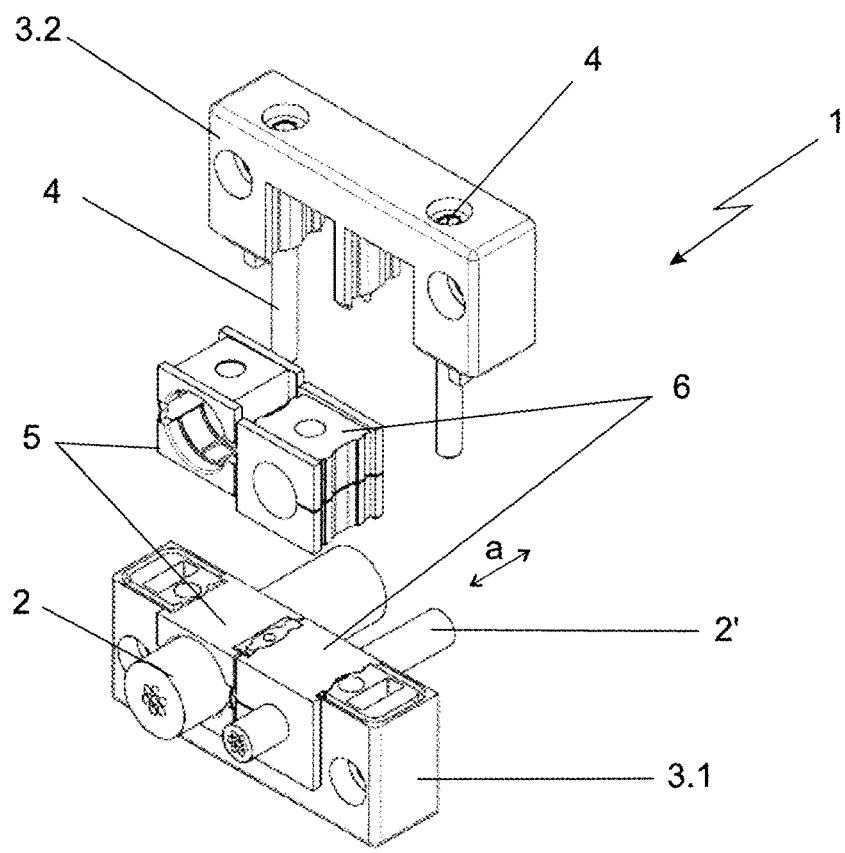
FIG. 8 shows an embodiment of the device according to the disclosure analogous to that in FIG. 1 in an exploded view.
Figure 9:
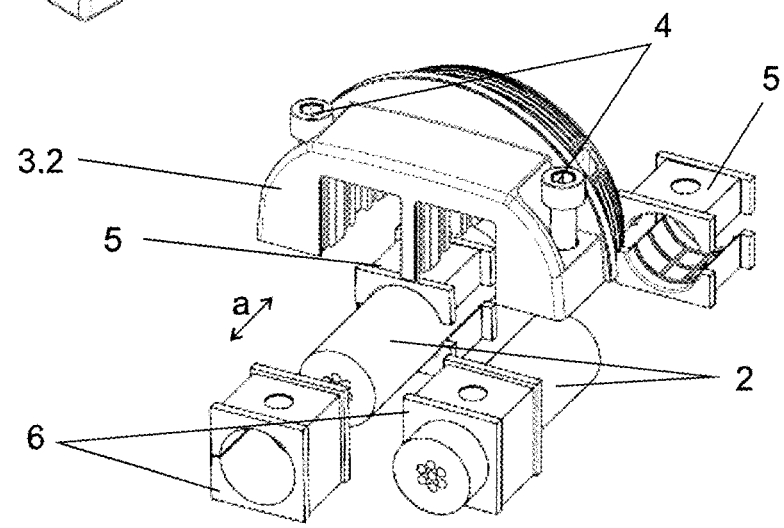
FIG. 9 shows an exploded view of the embodiment variant according to FIG. 2.
Figure 9:
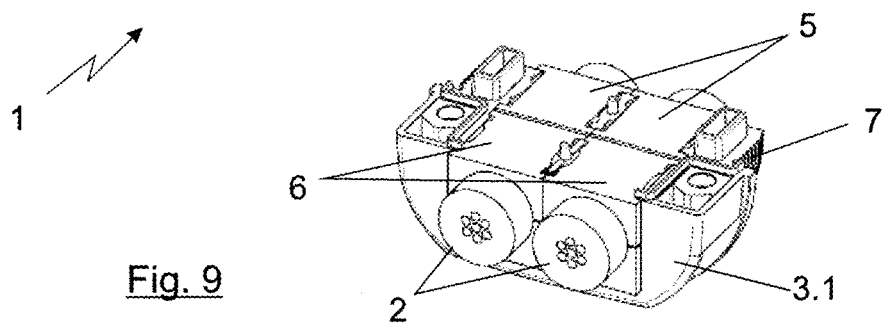

The illustrations in FIGS. 8 and 9 now show two exploded views. One shows a structure analogous to that in FIGS. 1 and 4. Unlike there, however, sealing grommets 6 are inserted or will be inserted here between the two frame parts 3.1 and 3.2 of frame 3 in the two right-hand receiving chambers, once for a strand 2' with a smaller diameter than the strands 2 shown so far and once at the top, without the strand 2 being shown here, for a strand with a diameter analogous to that in FIG. 1. Next to this, in the two receiving chambers lying one above the other on the left, strain relief grommets 5 are provided in each case. Strain relief grommets 5 and sealing grommets 6 can therefore also be used in combination in the one frame 3, for example if higher forces have to be absorbed by the strain relief in the case of strands 2 with larger diameters than in the case of smaller diameters, such as that of strand 2'.

The illustration in FIG. 9 shows an exploded view of the structure shown in FIGS. 2, 3 and 5. As was already evident from FIGS. 2 and 3, the frame 3 or its upper part 3.2 and its lower part 3.1 is designed here in such a way that two preferably identical receiving chambers are arranged one behind the other in the axial direction a of the strands 2. In the receiving chambers at the front in the view according to FIGS. 2 and 9, sealing grommets 6 are inserted in each case or are inserted accordingly, as can be seen in the exploded view of FIG. 9. Strain relief grommets 5 are then inserted into the receiving chambers located behind in the axial direction a of the strands 2, which can be arranged within the threaded section 7. This provides very good strain relief of the strands 2 by the strain relief grommets 5 in combination with good sealing by the sealing grommets 6. Since the sealing grommets 6 no longer have to provide strain relief here, since this is completely taken over by the harder material of the strain relief grommets 5 or their sections 5.1 and 5.2, these can also be made of even softer and more flexible material than was previously usual.

Figures 10, 11:
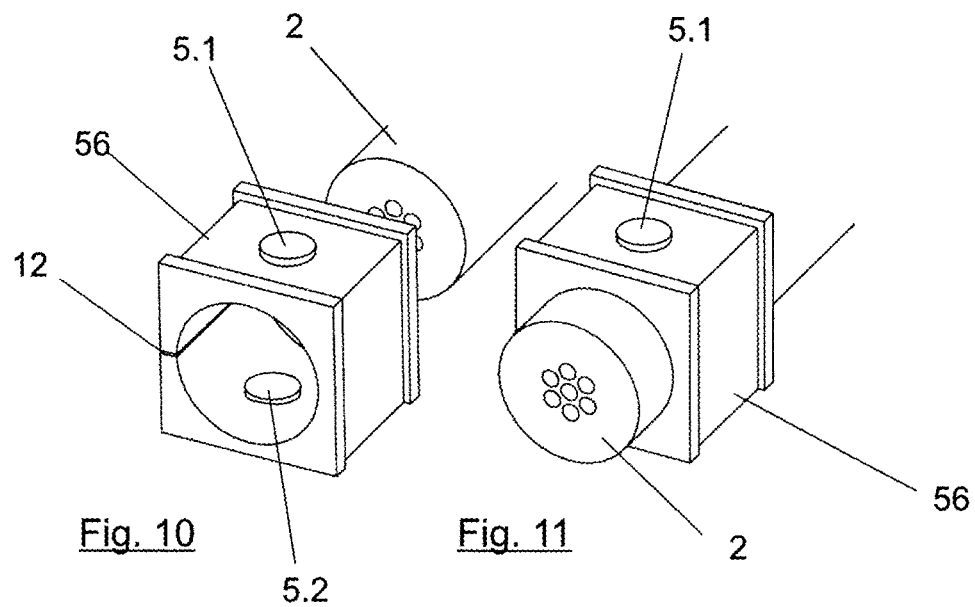
FIG. 10 shows another possible embodiment of a strain relief grommet in the form of a combination grommet without inserted strand.
FIG. 11 shows a view analogous to that in FIG. 10 with the strand inserted.

The illustrations in FIGS. 10 and 11 show a further embodiment of the strain relief grommet 5. It is constructed in such a way that it is combined with a sealing grommet 6. This combined grommet bears the reference numeral 56 and can be seen in FIG. 10 without strand 2 inserted and in FIG. 11 with strand 2 inserted. The combination grommet 56 acts as a strain relief grommet 5 and sealing grommet 6 in one, so that even in assemblies without two grommets one behind the other in the axial direction a of the strand 2, very good strain relief can be combined with very good sealing. The combination grommet 56 itself is made of a suitably soft and elastic material, for example the material from which sealing grommets 6 are conventionally made. In its simplest embodiment variant, shown in FIGS. 10 and 11, it comprises, in the view of the figures, an opening, for example a circular bore, at the top and bottom respectively. Sections 5.1 and 5.2 can be seen in this. They are accommodated in corresponding openings of the softer and/or more elastic material of the combination grommet and are themselves formed as harder sections 5.1, 5.2, for example of soft polyamide or the like.

When the frame parts 3.1 and 3.2 are pressed together, these sections 5.1 and 5.2 are pressed together either directly or, in the case of a structure with several such combination grommets, via the sections 5.1, 5.2 in the adjacent grommets, so that the force is again transmitted exclusively via the sections 5.1 and 5.2 and the strand 2 or strands 2, while the softer and more elastic areas around the strand 2, which are made of the material of the actual sealing grommet 6, merely provide the seal. The strain relief is thus realized by the sections 5.1 and 5.2, which are designed here as pins, which, depending on the shape of their surfaces, rest against the sheath of the strand 2 and, optionally, deform this sheath to a certain degree, thereby ensuring a high degree of strain relief. Like the sealing grommet 6, the combination grommet 56 is provided with a hinged design. A slot 12 of the combination grommet 56 is then pressed, like the slot 12 of the pure sealing grommets 6, as well as their outer surface, with the frame or with each other with another grommet, or in the area of the slot 12 with the material of the same grommet. Nevertheless, the combination grommet 56 can be unfolded in the disassembled state in order to insert prefabricated strands 2. In this case, the softer and/or more elastic material connects sections 5.1 and 5.2.

Figures 12, 13:
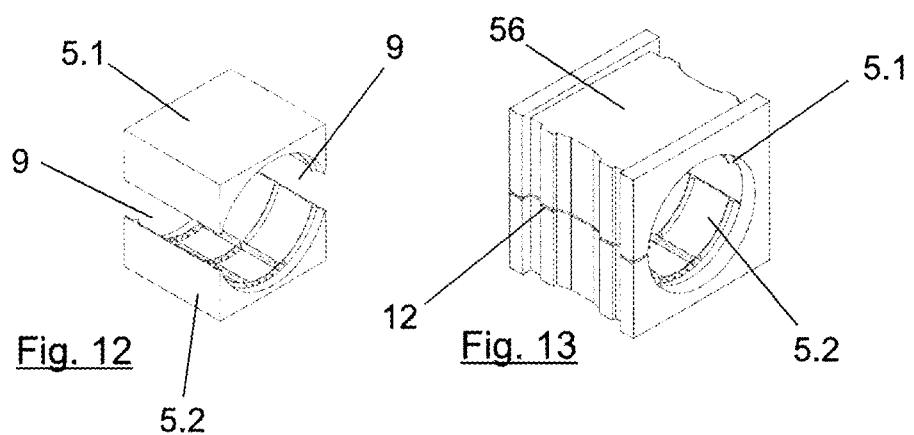
FIG. 12 shows a possible embodiment of the sheathing sections in an alternative variant of the combination grommet.
FIG. 13 shows the alternative variant of the combination grommet with the sections from FIG. 12.

This concept can also be realized with structures similar to those of strain relief grommet 5 in the previous figures. In FIG. 12, such an inlay is shown in the same style as that of strain relief grommet 5 with upper section 5.1 and lower section 5.2 correspondingly. This inlay can be inserted into a corresponding opening, create itself, as it were, these openings during compression by deforming the softer material, or can preferably be partially extrusion-coated from the material otherwise used for the sealing grommets 6, so as to obtain the combination grommet 56 as shown in FIG. 13, which is designed in a substantially comparable manner to the combination grommet 56 of FIGS. 10 and 11. However, instead of the pins movable in bores as sections 5.1 and 5.2, it now has the sections 5.1 and 5.2 known from the previous figure. The film hinge 8 can be dispensed with here as shown in the embodiment of FIG. 12, but it could still be present. The two sections 5.1 and 5.2 in the combination grommet 56 according to the embodiment in FIG. 13 continue to be connected correspondingly only via the elastic material with which they are extrusion-coated, so that the force is again transmitted almost exclusively via the strand 2 from one section 5.1 to the other section 5.2. Nevertheless, the elastic material present, which does not significantly affect this force transmission, can still ensure very good strain relief and, at the same time, a good seal. It is true that the forces to and from sections 5.1, 5.2 in the variant shown in FIG. 13 are also transmitted via the elastic material. However, the flat areas above and below sections 5.1 and 5.2 used for this purpose have a completely different effect in terms of the transmission of forces than the narrow lateral "band", which is quasi unable to transmit any forces parallel to the strand between sections 5.1 and 5.2.

The illustration in FIG. 14 once again shows a structure which is analogous to the illustration in FIGS. 6 and 7. The strain relief grommet 5 consisting here of the two sections 5.1 and 5.2 is shown in a side view. It corresponds essentially to the structure in FIG. 7, the difference being that the gap 9 now does not extend in a plane parallel to the axial direction a of the inserted strand 2, but at an angle thereto. The sections 5.1 and 5.2 continue to be spaced apart from each other or at most connected by the film hinges 8. However, they are arranged in such a way that a view through the device is not possible due to the slope. This means that it is not possible to look inside a switch cabinet, for example, and coarse dirt is prevented by the slanted arrangement of the gap 9. In principle, this structure could also be used accordingly in a combination grommet 56, for example in recesses, inserts or extrusion-coating with softer material. In practice, however, the oblique arrangement is of interest above all in the construction of the strain relief grommet 5 from the two sections 5.1 and 5.2 alone.

Figures 14, 15:
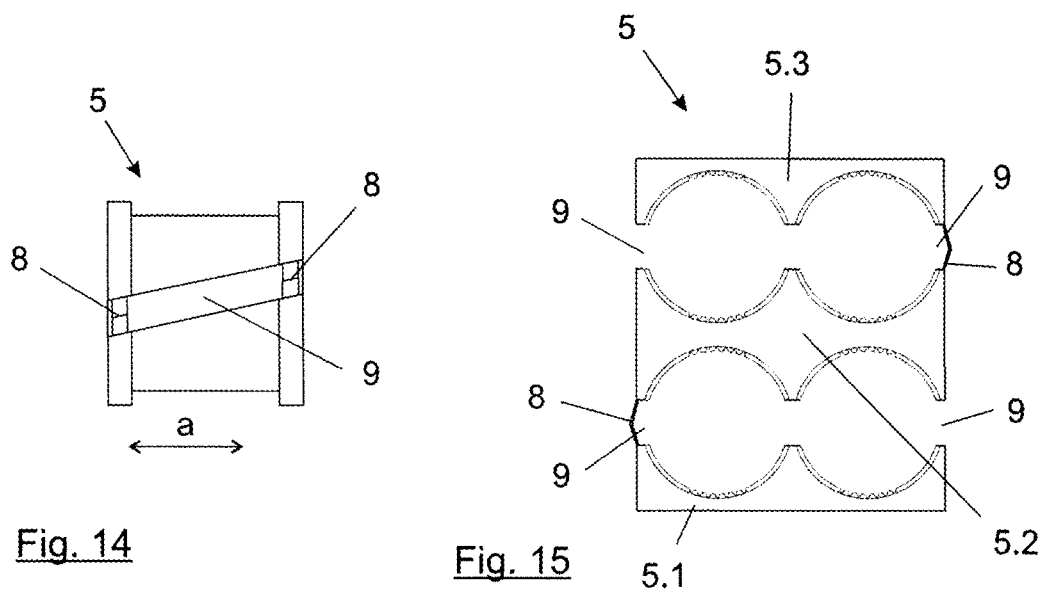
FIG. 14 shows an alternative embodiment of the strain relief grommet analogous to that in FIGS. 6 and 7.
FIG. 15 shows another alternative embodiment of the strain relief grommet analogous to that in FIGS. 6 and 7, here for accommodating four strands.

It is understood that the structure cannot only be used in such a way that one strand 2 at a time is passed through the individual grommet. By way of example only, a structure is shown in FIG. 15 which is analogous to the strain relief grommets 5 of FIGS. 1 to 9. It is designed to accommodate four individual strands 2, which are not shown here. For this purpose, in the illustration of FIG. 15, there is a lower section 5.1 with two half-openings for the strands 2 arranged next to each other. Above this, there is a section 5.2 which has two half-openings for the strands 2 both above and below, and above this, there is a section 5.3 which is again constructed as a mirror image of section 5.1. In this way, when closing a frame with a chamber for larger grommets, strands can be compressed here in a receiving chamber and with a strain relief grommet 5 at the same time. Here, too, it would in principle be conceivable to implement sections 5.1, 5.2 and 5.3 separately from one another. It is particularly useful if these are in turn connected to one another via film hinges 8, preferably in the manner shown here, so that the film hinge 8 between sections 5.1 and 5.2 is arranged on the other side than the film hinge 8 between sections 5.2 and 5.3. In this way, the structure can be produced correspondingly simply and efficiently, since it can be unfolded altogether to form a longer structure, which is of decisive advantage with regard to production, for example by injection molding or the like, since it keeps the mold and demolding simple.

This variant can obviously be used with and without the film hinges again both with the pure strain relief grommet 5 and with a combination grommet analogous to that in FIGS. 10 to 13 accordingly.

The invention claimed is:

1. A device for feed-through and strain relief of strands through a wall opening, the strands extending along an axial direction, comprising:
   a frame disposable within the wall opening and including at least two detachably connected frame parts; and
   at least one strain relief grommet positioned within the frame, the strain relief grommet substantially enclosing at least one of the strands and including at least two grommet sections which, in a compressed state with a strand inserted between the grommet sections, are spaced apart from one another with a gap therebetween which extends in a plane one of parallel and oblique to the axial direction of the inserted strand, and wherein the grommet sections have a hardness greater than 75 Shore A and also do not abut one another in use such that a compressive force between the at least two grommet sections is transferred via the strand.

2. The device of claim 1, further comprising an elastic region connecting the first and second grommet sections.

3. The device of claim 1, wherein the at least two grommet sections are inserted into corresponding openings of the at least two frame parts.

4. The device of claim 1, wherein the frame sections include projections disposed proximate a location of contact between the strand and the grommet sections.

5. The device of claim 4, wherein the projections extend in one of an axial direction and a transverse direction relative to the axial direction of the strand.

6. The device of claim 5, wherein the projections include a plurality of perforations disposed in a circumferential direction of the strand.

7. The device of claim 1, wherein in the axial direction of the strand, upstream or downstream of the strain relief grommet, a sealing grommet is provided for abutment against the strand and for positive accommodation in the frame, the sealing grommet having a hardness of less than 75 Shore-A.

8. The device of claim 7, wherein the sealing grommet is formed in one piece and is foldable to an open position along the axial direction of the strand and including a slot that is closed in a closed position of the sealing grommet.

9. The device of claim 2, wherein the at least one elastic region is formed as a film hinge.

10. The device of claim 1, wherein the grommet sections further include projections extending from contact surfaces thereof.

11. The device of claim 1, wherein the grommet sections include external projections engaged within the frame parts.

* * * * *